UNITED STATES PATENT OFFICE.

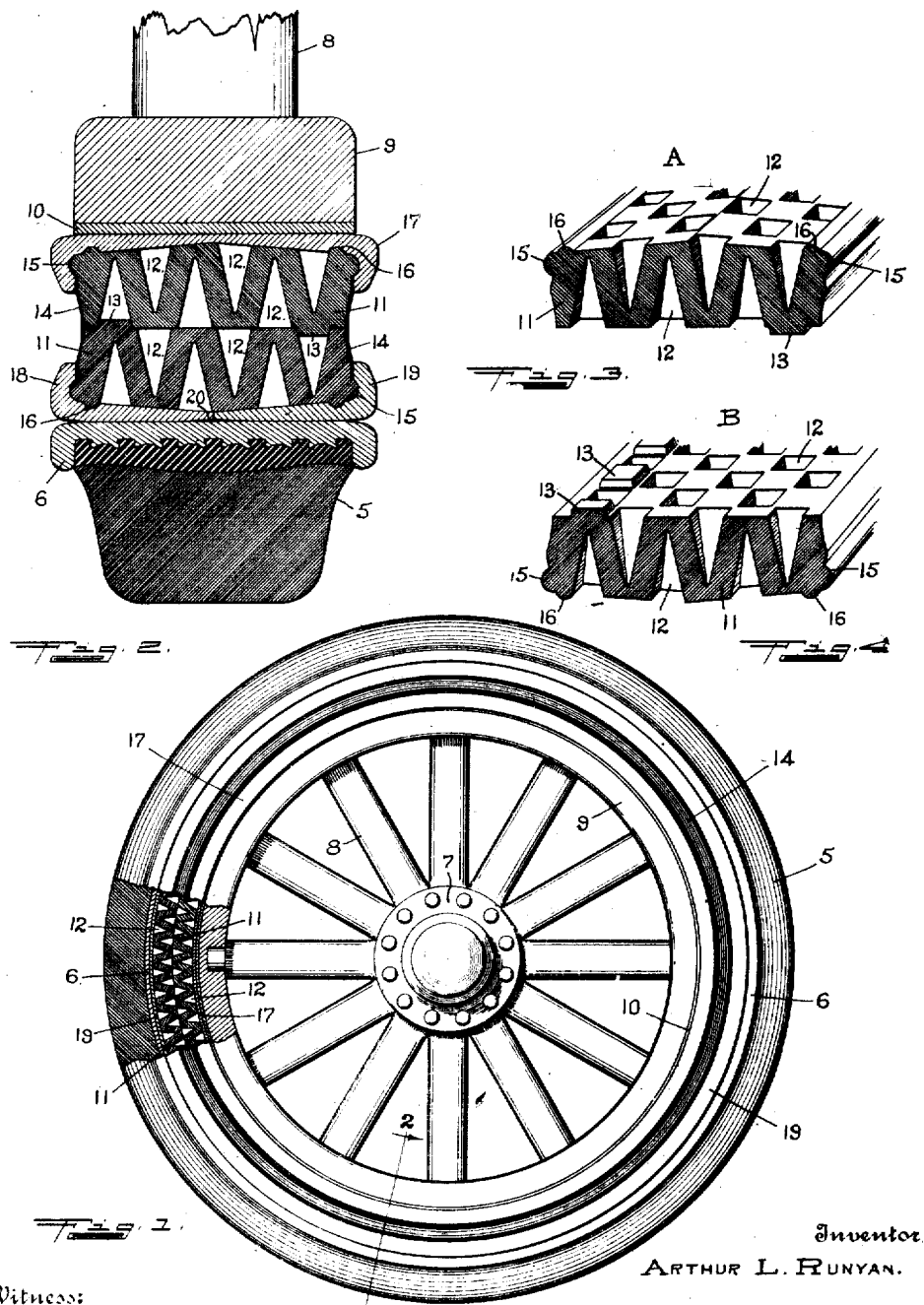

ARTHUR L. RUNYAN, OF OMAHA, NEBRASKA.

WHEEL-CUSHION AND MEANS FOR MOUNTING SAME.

1,343,684.  Specification of Letters Patent.  Patented June 15, 1920.

Application filed February 1, 1919. Serial No. 274,579.

*To all whom it may concern:*

Be it known that I, ARTHUR L. RUNYAN, a citizen of the United States, and a resident of Omaha, in the county of Douglas and State of Nebraska, have invented certain new and useful Improvements in Wheel-Cushions and Means for Mounting Same, of which the following is a specification.

My invention relates to the construction of resilient tires and wheels, and particularly to that class of wheels employing an outer wearing-tread mounted permanently upon a metal rim and having interposed between the rim and the wheel-band a shock-absorbing cushion. It is the object of my invention to provide for wheels of this class an improved form of cushion, and means for assembling and mounting the same, whereby the tire-and-cushion structure may be completely assembled and at any subsequent time placed upon or removed from a wheel, without otherwise disturbing the assembly. A further object of my invention is to provide a resilient cushion for use in structures of the class described, wherein the cushion as formed initially comprises a pair of similar parts, each having a multiplicity of spaced air-pockets therein, and said pair of parts, when assembled to form the complete cushion, being interlocked with each other so as to fit together in a definite relation such that the pockets opening to the adjacent surfaces of the parts are sealed to confine the air therein. A further object of my invention is to provide a cushion and mounting of this character, wherein the several concentric parts are retained laterally without the use of side-members overlapping the same radially, and without the use of bolts, screws or like fastening devices.

In the accompanying drawings Figure 1 is a side view of a wheel provided with a cushion and mounting therefor embodying my invention, a portion of the structure being in vertical section, Fig. 2 is an enlarged detail transverse section on the line 2—2 of Fig. 1, Fig. 3 is a perspective view of one of the cushion parts, and Fig. 4 is a perspective view of another part of the cushion, each of the two latter figures disclosing a transverse section of the respective cushion part.

In carrying out my invention according to the illustrated embodiment thereof, I employ a solid rubber tire 5 mounted upon a channeled rim 6, said tire and rim being of the form and construction known commercially as standard "S. A. E." solid tire and rim. The wheel is also of standard form and construction, having the usual hub 7, spokes 8, felly 9, and a metal band 10 secured upon the periphery of the felly. The tire-rim 6 is one or more nominal sizes larger than the wheel-band 10, however, so that when said rim and band are disposed concentrically a suitable annular space is formed between them for the reception of my special cushion and mounting means.

The body 11 of the resilient cushion provided by my invention is made of soft rubber or like material, and is molded initially in two rectilinear strips A and B, which are identical in form but are reversed in the assembled structure, so that their corresponding faces are respectively opposite each other. In general, the transverse sectional form of the strips is rectangular, being of greater width than thickness, but varying from a true rectangle in the particulars hereinafter mentioned. The upper and lower, or inner and outer, faces of the strips each have formed therein a series of tapering air-pockets 12, the bases or larger ends of said pockets being coincident with said faces, and each pocket as a whole being wedge-shaped or pyramidal in form. In each face the pockets 12 are spaced apart both transversely and longitudinally of the strip, the openings of the pockets being arranged like the alternate squares of a checkerboard, but being slightly smaller than the intervening continuous surfaces or parts of the face. The pockets opening to one face of the strip are also in alternating or staggered relation to the pockets opening to the other face of the strip, whereby the point or apex of each pocket is in proximity to a solid plane-surfaced part of the face of the strip opposite that to which the pocket opens. The side-portions or edges of the strips are slightly less in thickness than the central portion thereof, the reduction of thickness being made entirely on one face of each strip, so that the other face is substantially flat or plane-surfaced from edge to edge. The latter face is provided, however, adjacent to one edge thereof and upon the portions intermediate the pockets 12 of the longitudinal row adjoining said edge, with a series of lugs 13 of which the form is identical with that of the pockets 12, considering the latter as taken to a depth from the face of the strip equal to the height of the lugs therefrom. Thus, it will be seen, from Figs. 2, 3 and 4, that when the cushion-strips are reversed and the flat faces thereof juxtaposed, the lugs 13 of each strip will enter the pockets at the opposite edge of the other strip, thereby interlocking and establishing a relation of the abutting faces of the strips such that the ends of the pockets 12 opening to said faces will be closed respectively by the portions intermediate the pockets of the other strip.

In forming the complete cushion, the strips A and B are juxtaposed as above described, and secured together by cementing or vulcanizing, or both, and at the sides of the cushion the joint between the strips is preferably covered by strips 14 of fabric or the like, as shown in Fig. 2, said strips 14 being permanently attached to the cushion in the same manner that the cushion-strips are attached to each other. Obviously, as the cushion-strips are initially rectilinear while the completed cushion is of annular form, the outer strip B must be slightly elongated to provide the greater circumferential length, but, owing to the character of the material employed therein, such elongation of said strip may be readily effected without causing any appreciable stress or distortion thereof. Each of the strips A and B will also have a radial joint at the abutting ends thereof, and said end-joints of the strips may be offset circumferentially, so that each will be adjacent to a continuous portion of the other strip.

The sides or edges of the cushion which receive the joint-strips 14 are slightly hollowed, as shown, and at each corner of the cushion there is a laterally extending rounded bead 15 and a similar radially extending bead 16. Said beads 15 and 16 are adapted to fit firmly into annular grooves in the cushion-retaining rings, the beads 15 tending to resist radial displacement of the cushion from the rings, and the beads 16 tending to prevent lateral displacement of the beads 15 from their grooves. Adjoining the beads 15, between the same and the hollowed portions which receive the joint-strips 14, the sides of the cushion are slightly flared, and the flanges of the retaining-rings are so formed as to press said flared portions into parallelism, so that an especially tight joint is formed between the cushion and the edges of said flanges.

In the assembling of the retaining-rings and cushion, the latter is first placed upon the inner ring 17, which is a continuous annular metal body having side-flanges extending outwardly to embrace the lateral portions or edges of the cushion, and being grooved, as above mentioned, to receive the beads 15 and 16. The outer retaining-ring is of a transverse sectional form similar to the ring 17 but is made in two symmetrical parts 18 and 19, being divided in a plane intermediate the inwardly flanged sides thereof. The outer retaining-ring, formed by the parts 18 and 19, is of such external diameter as to be a force-fit within the tire-rim 6, except near the inner edges of the said parts 18 and 19, where the same are slightly beveled, as shown at 20 in Fig. 2, to facilitate the starting of said edges into the space between the rim 6 and the cushion-body. The assembling of the outer ring-parts 18 and 19 with the cushion and tire-rim 6 is effected simultaneously, the cushion, previously mounted upon the ring 17, being placed within and concentric to the rim 6, and said parts 18 and 19 then being forced into the intervening space between the rim and cushion.

The assembling of the cushion, retaining-rings, tire and rim, as above described, may be regarded as factory operations, and produce a commercially completed article ready to be sold as an entity, and to be put into use by merely pressing the ring 17 onto the band 10 of the wheel with which the tire is to be used, the operation being the same as the placing of a plain tire-rim, without the cushion, onto a wheel-band. The necessary mechanical equipment for so pressing tires upon wheels is common and widely dispersed, being normally employed for assembling and demounting standard tires and wheels of the class wherein the tire is retained laterally of the wheel by being a force-fit thereon, so that when pressed into place it is retained thereon frictionally. It will be observed that I employ this same principle of assembly for holding together laterally the several parts of my cushion-and-tire structure, so that it is unnecessary to use radially-overlapping members, bolts, screws or the like, for maintaining the parts in proper relative position. It will also be observed that in the assembled structure each of the air-pockets 12 of the cushion-body is effectively sealed so as to prevent the escape of air therefrom or the entry of foreign matter therein. By the use in the cushion of air-pockets of the described form and arrangement, a substantially permanent and highly resilient body is formed with the use of a minimum amount and weight of rubber, the structure being such that when under compression the side-walls of each pocket are gradually thickened and caused to flow into the pocket, to thereby reduce the volume thereof and compress the air therein according to the loads on the vehicle.

Now, having described my invention, what I claim and desire to secure by Letters Patent is:

1. The combination with a resilient tread-member, and a metal rim on which said tread-member is mounted, of an inner cushion-retaining ring having outwardly extending flanges and disposed concentrically with said rim, a resilient cushion held between the flanges of said retaining ring and extending outwardly therefrom, and an outer two-part cushion-retaining ring having inwardly extending flanges engaging the sides of the cushion, said ring divided at a plane intermediate the flanges thereof and the two parts thereof being force-fitted within said rim so as to be frictionally retained laterally thereof, and said inner cushion-retaining ring being force-fitted upon a wheel-band so as to be frictionally retained laterally thereof.

2. The combination with a wheel and an outer substantially rigid annular member, of a resilient annular cushion interposed between the wheel-rim and said member, an integral retaining-ring force-fitted upon the wheel-rim and having side-flanges embracing the inner side-portions of the annular cushion, and a two-part retaining-ring force-fitted within the annular member and having side-flanges embracing the outer side-portions of the annular cushion, said two-part retaining-ring being divided circumferentially between its side flanges into separate side sections.

3. In a structure of the class described, an annular cushion of substantially rectangular transverse section and having integral laterally extending and radially extending beads adjacent to each corner thereof, and metal retaining-rings embracing the outer and inner faces and portions of the sides of said cushion, said retaining-rings grooved to receive the lateral and radial beads at the corners of the cushion, and one of said retaining-rings divided circumferentially between its side edges to form side sections adapted to be forced respectively within a rigid annular member and to be frictionally retained thereon.

4. In a structure of the class described, an annular cushion of resilient material, comprising concentric parts each of approximately rectangular transverse section, each of said cushion-parts having series of tapering air-pockets in the inner and outer faces thereof, said air-pockets opening to said faces so that the openings and the continuous portions of each face form a checkerboard arrangement and the opening of each pocket is opposite a continuous portion of the opposite face, said cushion-parts being juxtaposed so that in the abutting faces thereof the opening of each pocket is opposite a continuous portion of the other cushion-part, whereby to close the openings of the respective pockets, and means on each cushion-part adapted to extend into some of the pockets of the other part to interlock the parts against relative lateral movement.

5. A cushion of the class described, comprising separately formed concentric parts each having in the inner and outer faces thereof series of air-pockets spaced apart laterally and circumferentially, the pockets opening to said faces and the sides of said pockets converging toward the opposite faces of the respective parts, the pockets in opposite faces of each part being relatively interspaced to provide substantially uniform walls between the pockets, the abutting faces of the parts being adapted to mutually close the pockets of the opposing faces, and means on each part fitting into some of the pockets of the adjoining part to retain said parts against relative lateral displacement.

ARTHUR L. RUNYAN.